C. F. Wharf,
Ventilator.
No. 97,576.　　　　　Patented Dec. 7, 1869.

Witnesses:
J. F. Olmstead
Henry C. Upperman

Inventor:
Charles F. Wharf

United States Patent Office.

CHARLES F. WHORF, OF ST. LOUIS, MISSOURI.

Letters Patent No. 97,576, dated December 7, 1869.

VENTILATOR.

The Schedule referred to in these Letters Patent and making part of the same.

*To all whom it may concern:*

Be it known that I, CHARLES F. WHORF, of the city of St. Louis, in the county of St. Louis, and in the State of Missouri, have invented an Improved System of Heating and Ventilating Hot-Houses, Greenhouses, &c.; and do hereby declare that the following is a full, clear, and exact description thereof, reference being had to the annexed drawings, making a part of this specification, in which like letters of reference refer to like parts, and in which—

Figure 1:
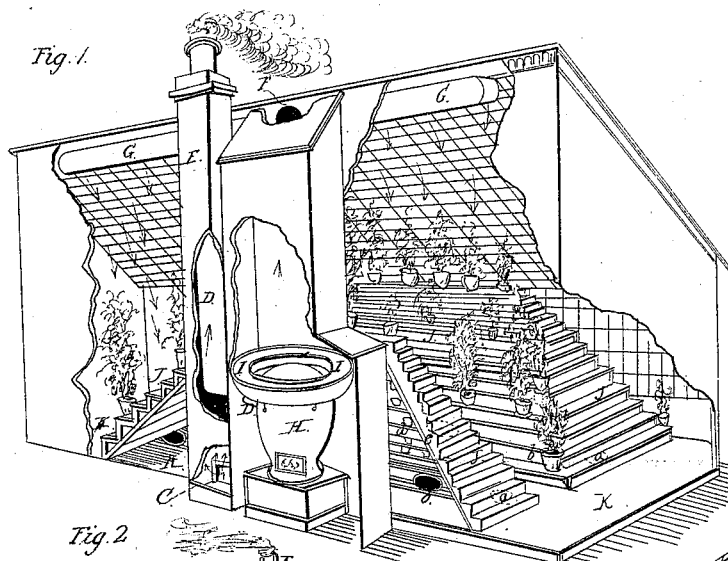
Figure 1 represents a perspective view.
Figure 2:
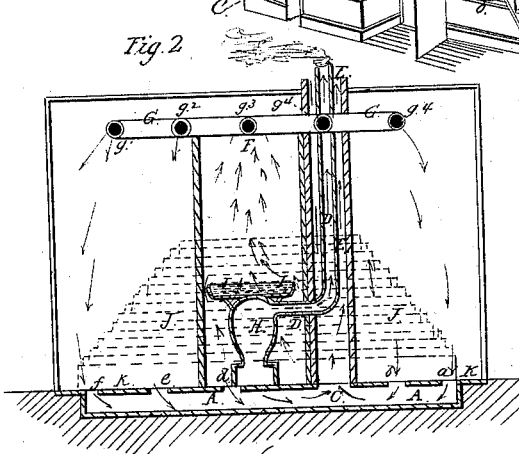
Figure 2 is a longitudinal section.
Figure 3:
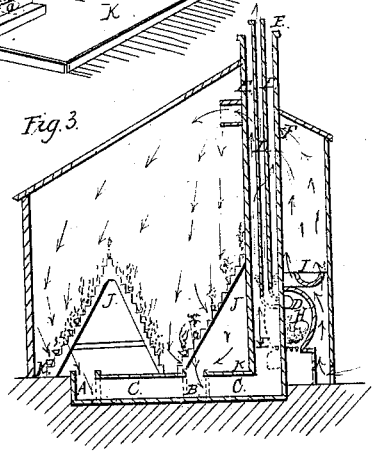
Figure 3 is a transverse section.
Figure 4:
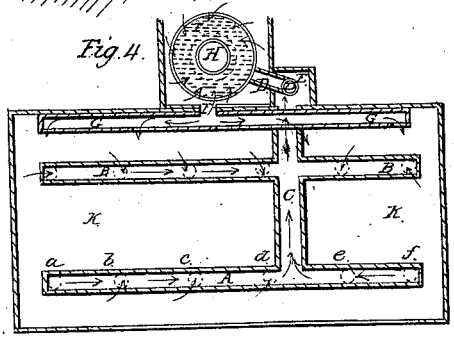
Figure 4 is a plan view.

This invention is for the purpose of supplying, in winter, hot-houses, greenhouses, conservatories, &c., with warm vaporized air, containing all the properties and ingredients of natural air, for due nourishment and vigorous growth of the plants; and which is supplied to them by a process of heating and ventilation, whereby the plants receive a continuous fresh current of air, similar to that of summer. This I accomplish by the following apparatus:

First, for eliminating the cold air, and also the surplus oxygen which has been thrown off by the plant, an arrangement of a system of eduction-pipes to the ventilating-stack, as follows, viz, two or more horizontal pipes or ducts, A B, united (if more than one) by a cross-pipe, C, leading to the ventilating-stack E. The pipes may be laid beneath the floor K, of the house, and contain several openings, *a, b, c, d,* &c., into them through the latter. The ventilating-stack E may be built of brick, and encloses the smoke-pipe D, of the heater or furnace H, which pipe runs vertically up it until it reaches a point some distance above the top of the ventilating-stack. The heat of the smoke-pipe, by rarefying the air in the flue of ventilating-stack, causes the ascent of all air introduced by the eduction or ventilating-pipes A, B, C, &c., hereafter described.

Second, the air introduced into the house is heated and also vaporized and prepared for the supplying of life and health to the plant by evoporating bodies of water in reservoirs I, near the heater H. The pipe or duct F introduces the vaporized air from the heater or room in which the heater is placed, into the house near the top of the latter, into the horizontal pipe or duct G at said place. This pipe has several openings into the room, but those toward the extremities of the same, should be the largest, to secure a proper supply of the air at those parts of the house.

The operation of this arrangement is as follows:

The heater or stove H being filled with fuel, and lighted, the outer air immediately enters, and passing up along the surface of the heaters and over the water-reservoirs, saturates itself with the vapor, passes on upward through the duct F, into the pipe or duct G, into the house, when it begins to descend over and through the leaves of the plants, supplying them with a continual current of fresh, pure, and healthy air. The descent of the vaporized air is the downward current caused by the eduction or ventilating-stack E, the rarefying action of the heated smoke-pipe D, of the furnace or heater H within the stack being, of course, the cause of the ventilating-draught carrying off, with the descending air, all noxious gases thrown off by the plants, &c.

Advantages.

Plants, like animals, especially when reared in a house, require a constant renewal of healthy air, and as the plant receives nine-tenths of its nourishment from the air, that air should contain all the natural properties and constituents of the outer air, and should be continually renewed in a current of fresh air properly tempered, and supplied with vapor, passing around them. This desideratum I believe to be secured by my plan, as above described. In the present mode of heating greenhouses, the heating-apparatus or furnace is situated in the house, and the heating is, by direct radiation therein, thus precluding all ventilation or change of air. This plan also dispenses with watering, as the entering warm air may be fully saturated with water, if necessary, thus keeping the earth perpetually moist, and flowers and vegetables may be grown all the year round.

Having thus fully described my invention,

What I claim therein as new, and desire to secure by Letters Patent, is—

The furnace or heater H, with reservoir I, and smoke-pipe D, in combination with ventilating-stack E, pipe or duct G, provided with openings, and pipes or ducts A B C, arranged and operating substantially in the manner and for the purpose described.

In testimony that I claim the foregoing system of ventilating and heating, &c., I have hereunto set my hand, this 27th day of July, A. D. 1869.

CHARLES F. WHORF.

Witnesses:
J. F. OLMSTEAD,
N. T. JUDD.